United States Patent
Polak

[11] Patent Number: 6,130,539
[45] Date of Patent: Oct. 10, 2000

[54] AUTOMATIC GAIN CONTROL FOR A LINE LOCATOR

[75] Inventor: Stevan Polak, Aptos, Calif.

[73] Assignee: Metrotech Corporation, Sunnyvale, Calif.

[21] Appl. No.: 09/136,793

[22] Filed: Aug. 19, 1998

[51] Int. Cl.[7] .................................................. G01V 3/11
[52] U.S. Cl. ............................................ 324/326; 324/67
[58] Field of Search ............................ 324/67, 326, 327, 324/329, 244

[56] References Cited

U.S. PATENT DOCUMENTS

| | | | |
|---|---|---|---|
| 2,105,247 | 1/1938 | Jakosky | 324/363 |
| 3,707,002 | 12/1972 | Howell | 346/33 M |
| 4,006,445 | 2/1977 | Howell | 361/51 |
| 4,134,061 | 1/1979 | Gudgel | 324/559 |
| 4,151,458 | 4/1979 | Seager | 324/357 |
| 4,220,913 | 9/1980 | Howell et al. | 324/529 |
| 4,427,942 | 1/1984 | Sole | 324/326 |
| 4,542,344 | 9/1985 | Darilek et al. | 324/326 |
| 4,639,674 | 1/1987 | Rippingale | 324/326 |
| 4,659,989 | 4/1987 | Kerr | 324/233 |
| 4,990,850 | 2/1991 | Votruba | 324/225 |
| 5,001,430 | 3/1991 | Peterman et al. | 324/326 |
| 5,043,666 | 8/1991 | Tavernetti et al. | 324/326 |
| 5,065,098 | 11/1991 | Salsman et al. | 324/326 |
| 5,133,417 | 7/1992 | Rider | 175/45 |

FOREIGN PATENT DOCUMENTS

0 388 041 B1  2/1990  European Pat. Off. .

*Primary Examiner*—Jay Patidar
*Attorney, Agent, or Firm*—Skjerven, Morrill, MacPherson, Franklin & Friel LLP; David E. Steuber; Gary J. Edwards

[57] ABSTRACT

An automatic gain control (AGC) system for use in line locators that detect concealed conductors is presented. The AGC system includes determining an AGC signal from a reference sensor and processing signals from one or more observed sensors utilizing the AGC signal. The reference sensor is located farther from the concealed conductor than the observed sensors. The AGC system can be implemented in analog form or can include a digital AGC determination in a microprocessor.

11 Claims, 6 Drawing Sheets

AUTOMATIC GAIN CONTROL FOR A LINE LOCATOR

CROSS REFERENCE TO RELATED APPLICATION

This application is related to U.S. Application Ser. No. 09/136,767, "Line Locator Having Left/Right Detection," to Gopal Parakulum and Steven Polak, filed on the same date as the present application and herein incorporated by reference in its entirety. This application is also related to U.S. Application Ser. No. 09/136,794, "Line Locator Having Left/Right Detection," to Gopal Parakulum and Steven Polak, filed on the same date as the present application and herein incorporated by reference in its entirety.

BACKGROUND

1. Field of the Invention

This invention relates to AGC systems and, in particular, to an AGC system for signal processing in concealed conductor locator devices.

2. Background

It is often necessary to locate buried conduits, which are employed by numerous utility companies, in order to repair or replace them. In addition, it is important to locate conduit lines in order not to disturb them when excavating for other purposes (such as, for example, addition of new conduits). Examples of buried conduits include pipelines for water, gas or sewage and cables for telephone, power or television. Many of the conduits are conductors, such as metallic pipelines or cables. In other applications, it is often useful to locate concealed elongated conductors, such as power lines or copper water lines, concealed in the walls of buildings. It is well known to locate concealed elongated conductors ("lines") by detecting electromagnetic emissions from them.

A conducting conduit (a line) may be induced to radiate electromagnetically by being directly or inductively coupled to an external transmitter. In some instances, such as with power lines, the line may radiate without an external transmitter.

A line locator detects the electromagnetic radiation emanating from the line. Early line locators included a sensor that detects a time-varying magnetic field. The line locator detects a peak amplitude signal or a minimum amplitude signal from the sensor, depending on the orientation of the sensor, when the line locator is passed over the line. Later line locators have included multiple sensors to provide further information to the line locator regarding the line (such as, for example, proximity information).

Figure 1:
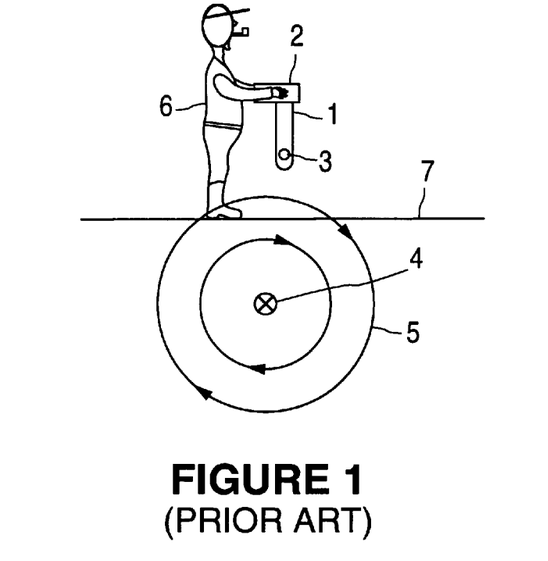
FIG. 1 shows a line locator being used to locate a concealed conductor.

FIG. 1 shows a line 4, beneath surface 7, that is radiating a magnetic field 5. Magnetic field 5 is generally directed in a circular fashion around line 4. Line locator 1 is held over line 4 by operator 6. Line locator 1 includes sensor 3 that detects magnetic field 5 and displays a signal on a display 2 that is indicative of the magnetic signal strength measured by sensor 3. Depending on the orientation of sensor 3 (i.e., whether it is sensitive to horizontal or vertical components of magnetic fields), display 2 will indicate a maximum signal or a minimum signal when line locator 1 is held directly above line 4 (where the magnetic field 5 is directed horizontally).

Figure 2A:
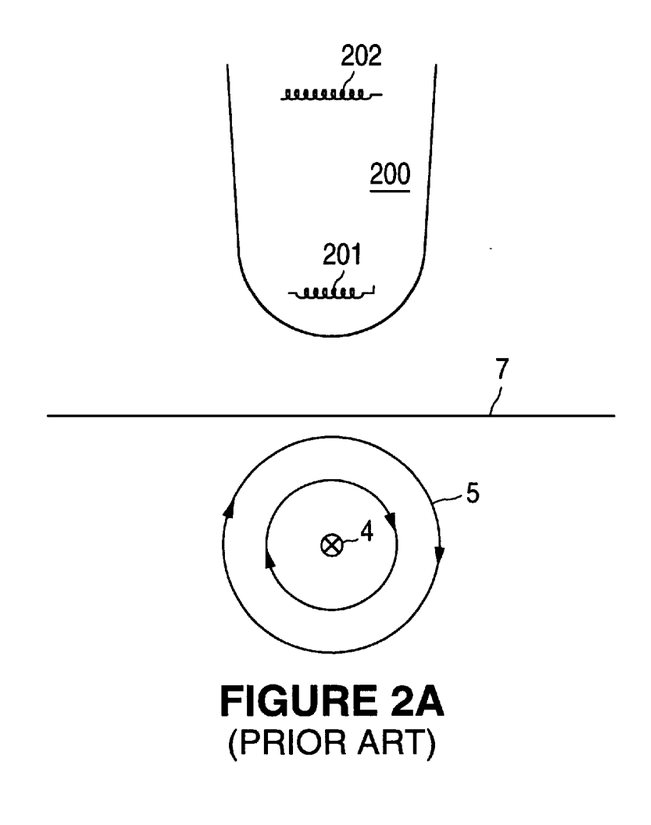
FIG. 2A is a schematic diagram of a line locator having a top sensor and a bottom sensor.

FIG. 2A shows a line locator 200 having a top sensor 202 and a bottom sensor 201. Top sensor 202 and bottom sensor 201 are both horizontally oriented to detect magnetic fields oriented horizontally with respect to surface 7. Each of top sensor 202 and bottom sensor 201 has an output signal indicative of its position relative to the source of the time varying magnetic field 5, line 4.

Figure 2B:
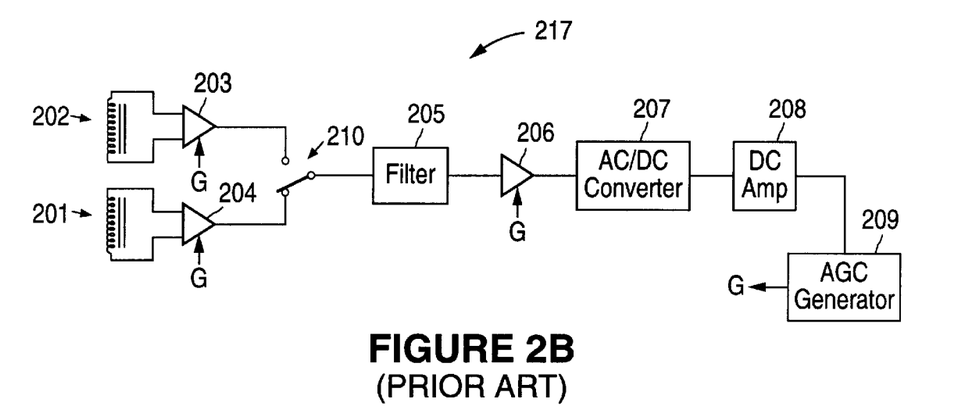
FIG. 2B is a block diagram of a circuit for receiving and displaying the output signals of the sensors shown in FIG. 2A.

FIG. 2B shows a block diagram of a circuit 217 for receiving and processing output signals from bottom sensor 201 and top sensor 202. The output signal from top sensor 202 is input to amplifier 203. The gain of amplifier 203 is set in response to a control signal G. The output signal from bottom sensor 204 is received by amplifier 204. The gain of amplifier 204 is set by control signal G. Switch 210 selects between the output signals from amplifier 203 or the output signal from amplifier 204. In operation, switch 210 is typically a momentary contact switch that normally selects the output signal from amplifier 204 (i.e., bottom sensor 201) and selects the output signal from amplifier 203 (i.e., top sensor 202) only when temporarily engaged. When switch 210 is engaged to receive output signals from top sensor 202, the control signal G is not allowed to vary. The output signal from switch 210 is filtered in filter 205. Filter 205 is typically a band-pass filter that passes signals of a particular frequency. In active operation, a current of a particular frequency is induced in line 4 by a transmitter (not shown) coupled to line 4. Typical frequencies of operation include 9.8 kHz and 82 kHz, but any convenient frequency can be used. In some instances, such as in a power line, line 4 may radiate electromagnetic radiation passively, i.e. without a transmitter.

The output signal from filter 205 is amplified in amplifier 206. The gain of amplifier 206 is set in response to control signal G. The output signal from amplifier 206 is converted to a DC signal in AC/DC converter 207 and amplified by DC amplifier 208.

The resulting output signal from circuit 217 is displayed to an operator (i.e., audibly with a speaker or visually through a meter) as an indication of the position of the line locator with respect to line 4. Engaging switch 210 so that the output signal from amplifier 203 is processed, in comparison with the processed output signal from bottom sensor 201, indicates the depth of line 4 below surface 7 or can be utilized for environmental noise compensation.

Figure 2C:
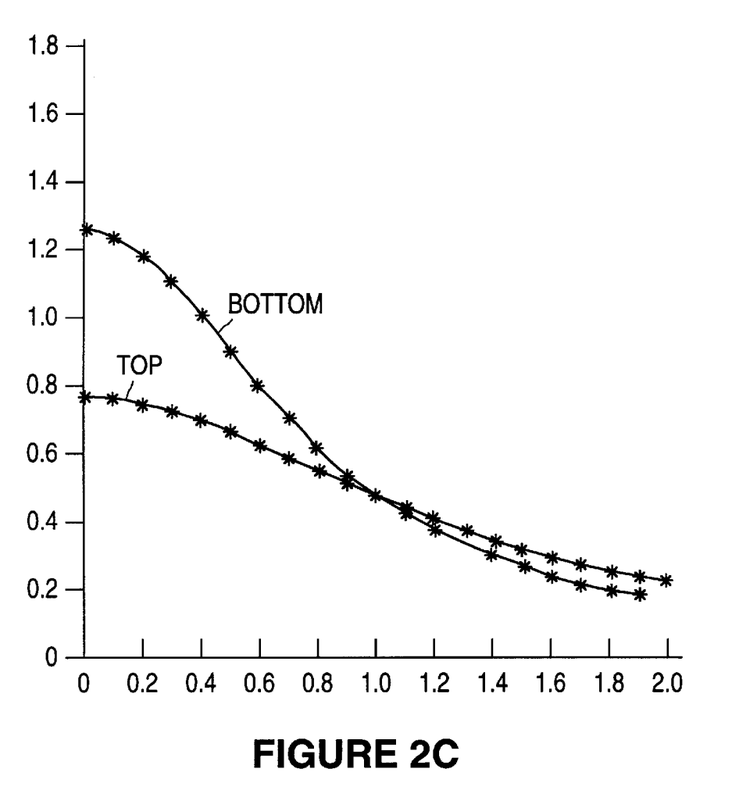
FIG. 2C is a graph showing typical output signals from the circuit shown in FIG. 2B as a function of lateral displacement of the line locator from an elongated concealed conductor.

FIG. 2C shows the top signal and the bottom signal as a function of lateral distance from line 4 with control signal G held at a constant voltage. Often the signals from sensors 202 and 201 are weak and their absolute magnitude may vary over a wide range in amplitude (in some cases about 100 dB) in response to environmental parameters such as current strength, depth and soil type. In such a case, the control signal G, which is often manually adjusted by the operator, must continuously be adjusted to compensate for the widely varying magnitude of the signals.

In some cases, an automatic gain control (AGC) circuit 209 is used to produce a control signal G. In that case, an AGC circuit 209 is coupled to the output terminal of DC amplifier 208. In FIG. 2B, circuit 217 is shown to include AGC circuit 209, which controls the gain of amplifiers 203, 204 and 206 by varying control signal G so that the output signal from DC amp 208 is at a constant amplitude regardless of the output signal from sensor 201 or sensor 202. The useful information about magnetic field strength, then, is embedded in the control signal G.

However, the control signal G, determined by AGC circuit 209, is typically very nonlinear with the magnitude of the input signal, which often varies drastically with parameters. For example, the first 20 dB of input signal change takes two thirds of the available AGC signal and the next 80 dB of input signal change takes about one third of the available control signal range. The available control signal, outputted by AGC 209, is the total range of voltages that AGC 209 is capable of producing and to which amplifiers 203, 204 and 206 are capable of responding.

Processing useful information from the AGC determined control signal results in the use of highly complicated circuitry. Therefore, there exists a need for a line locator system with an AGC system where useful signals are more easily obtained.

SUMMARY

In accordance with the present invention, an AGC correction voltage is derived from a reference channel which includes a reference channel sensor. The AGC signal can then be used in the AGC amplifiers of one or more observed channels, which include observed channel sensors. The reference channel sensor is arranged to be farther from the concealed elongated conductor than any of the observed channel sensors. In that case, the reference channel provides the AGC signal that is used in all of the channels and the observed channels provide output signals for display or further processing.

In one embodiment, the line locator includes a bottom sensor and a top sensor. The reference channel includes the top sensor and the observed channel includes the bottom sensor. The amplitude of the observed channel output signal, therefore, provides information about the lateral positioning of the line locator with respect to the underground conductor. The AGC signal, along with the bottom sensor output signal, can be used to indicate depth.

In another embodiment, the line locator includes more than two sensors. For example, a left/right line locator can include a bottom sensor, a top sensor, a left sensor and a right sensor. The AGC signal is determined in a reference channel that includes one of the sensors and the other channels are observed channels that provide output signals to a display. In the left/right line locator, an AGC signal may be derived from the top sensor output signal and used in other channels of the detection circuit for processing the output signals from the bottom sensor and the left and right sensors. In another example, the line locator may have one sensor for an observed channel, a second sensor in a channel to indicate the depth of the concealed conductor, and a third sensor for a channel that generates an AGC signal that controls the other channels.

In the figures, elements having the same or substantially similar functions are labeled identically.

DESCRIPTION OF THE INVENTION

Figure 3A:
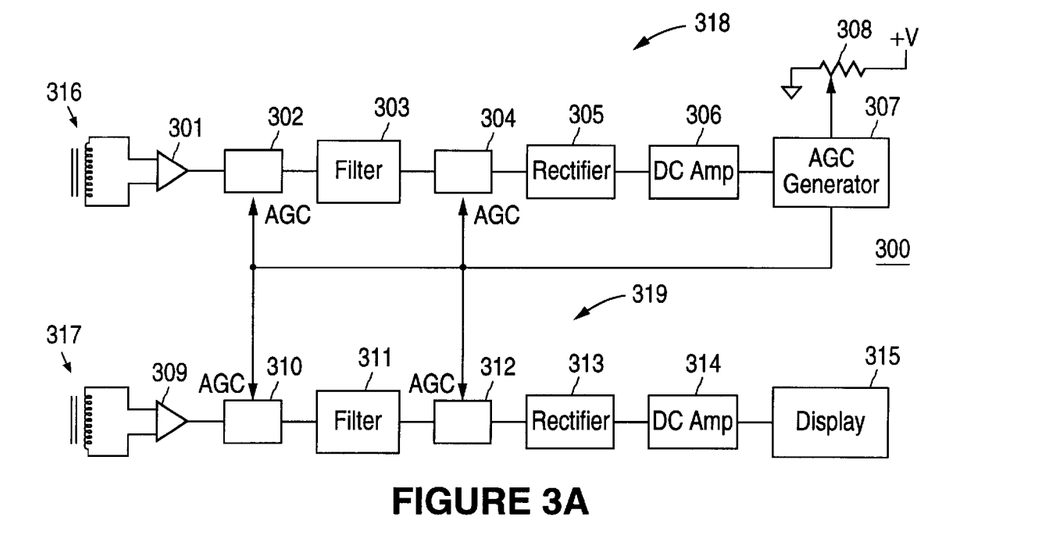
FIG. 3A shows a block diagram of a circuit for receiving and displaying the output signals according to the present invention.

FIG. 3A shows a block diagram of a signal processing circuit 300 according to the present invention. Circuit 300 includes two channels, a reference channel 318 and an observed channel 319. In general, a line locator according to the present invention includes any number of observed channels.

Reference channel 318 includes sensor 316, preamp 301, AGC amp 302, filter 303, AGC amp 304, rectifier 305, DC amp 306 and AGC generator 307. The observed channel includes sensor 317, preamp 309, AGC amp 310, filter 311, AGC amp 312, rectifier 313, DC amp 314 and display 315.

Sensors 316 and 317 are mounted within a line locator and can correspond to the top sensor 202 and bottom sensor 201 of FIG. 2A, respectively. In general, a line locator can include any number of sensors. Sensors 316 and 317 can be any pair of sensors included in a line locator where sensor 316 is located farther from line 4 than any of the sensors in observed channels.

Sensors 316 and 317 represent any device capable of detecting a magnetic field, including sensor coils, Hall effect probes, flux-gate sensors, or any other device capable of detecting a magnetic field. In most embodiments, sensors 316 and 317 comprise coils of wire wound about a bobbin. The center of the bobbin may contain a magnetic core. Sensor coils with no magnetic coils, i.e. air coils, are useful for high frequency applications, but sensor coils having magnetic cores will provide higher sensitivity at lower frequencies.

In general, the magnetic field sensors are sensitive to the orientation of the magnetic field and detect components of the field that are directed along an orientation axis of the magnetic field sensor. A horizontally oriented sensor, such as bottom sensor 201 in FIG. 2A for example, detects fields that are horizontally directed with respect to surface 7. In FIG. 2A, surface 7 may be the earth's surface or may be any other surface that conceals an elongated conductor such as, for example, a wall.

In FIG. 3A, the output signal from sensor 316 is amplified in preamp 301 and amplified again in AGC amplifier 302. The gain of an AGC amplifier is determined by the value of an inputted AGC signal. The output signal from an AGC amp is tailored to provide an input to the circuit element that follows the AGC amp. In FIG. 3A, the output signal from AGC amp 302 is input to filter 303.

In general, circuits for processing signals from the sensors will include multiple AGC amplifiers because including all of the gain required in the circuit in one amplifier is likely to overload components of the circuit that follow the amplifier. Including several amplifiers allows signals to be amplified as needed during processing through the circuit, without the risk of overloading particular components of the circuit. Each of the AGC amplifiers inputs a common AGC signal and each of the AGC amplifiers has a gain that is dependent on the AGC signal. The response of one AGC amplifier to the AGC signal may differ from other AGC amplifiers in the circuit.

Figure 3B:
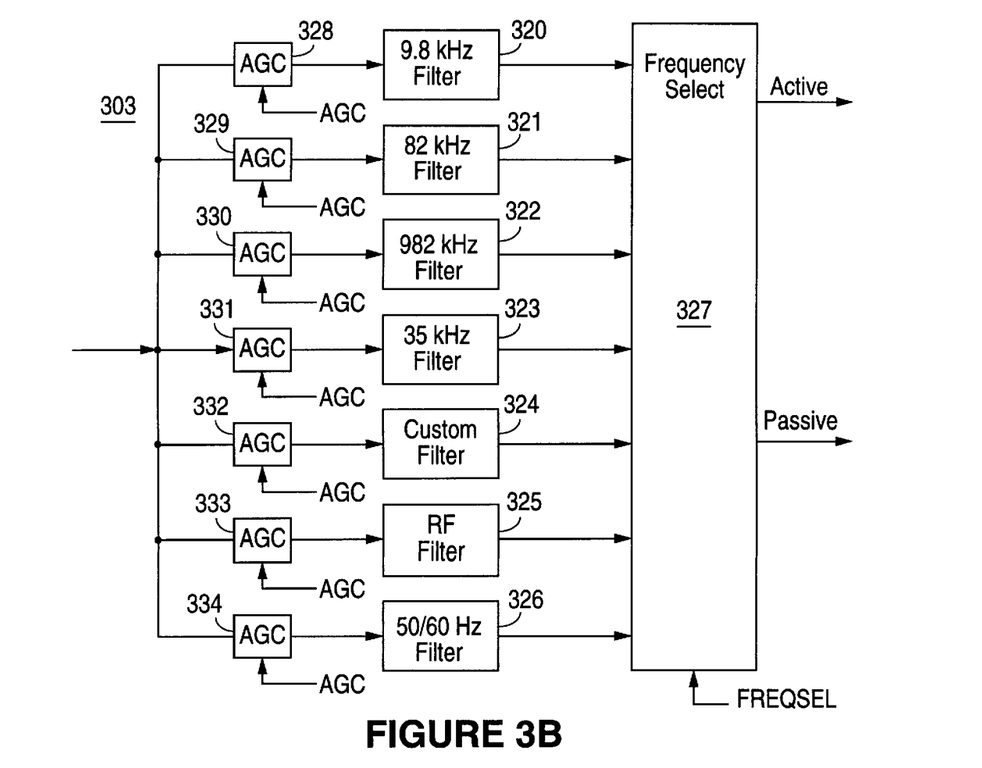
FIG. 3B shows a block diagram of a filter for the circuit shown in FIG. 3A.

Filter 303 of FIG. 3A is typically a band-pass filter tuned to pass signals of a particular frequency. In some embodiments, Filter 303 includes a single band-pass filter. Filter 303 is arranged to pass a frequency that is determined by an external transmitter or by the passive emission from the concealed conductor. For example, one embodiment includes a band-pass filter that passes a frequency of about 35 kHz. Other embodiments can pass single frequencies of 9.8 kHz, 88 kHz, 982 Hz, RF frequencies (about 10 kHz to about 20 kHz), 50/60 Hz signals, or any other frequency range that is required. Some embodiments of filter 303 can include the ability to select from one or more discrete frequencies or may include a tuner that is capable of selecting frequencies from a continuous spectrum of frequencies. FIG. 3B shows a filter 303 having the ability to pass signals selected from the frequencies 9.8 kHz, 88 kHz, 35 kHz, 50 Hz, 60 Hz or harmonics of 50 or 60 Hz, and a custom frequency.

FIG. 3B shows an embodiment of filter 303 that includes a filter array having a separate signal path for each of a 9.8 kHz filter 320, an 82 kHz filter 321, an active filter 322 for passing harmonics of 50/60 Hz, a 35 kHz filter 323, a custom filter 326, an RF filter 325, and a 50/60 Hz filter 324. In general, a separate path for any number of individual filters can be included in filter 303. Also, the filters can be of any type (e.g., active filters, passive filters, digital filters and pass-through filters).

In FIG. 3B, filter 303 receives input signals into each of the filter paths. In general, filter 303 can include any number of separate filter paths. In some embodiments, as shown in FIG. 3B, each filter path includes a separate AGC amplifier (i.e., AGC amplifiers 328–334) whose output signals are separately arranged to provide appropriate input signals for each filter (i.e., 9.8 kHz filter 320, 82 kHz filter 321, active filter 322, 35 kHz filter 323, custom filter 324, RF filter 325 and 50/60 Hz filter 326, respectively). In embodiments where an AGC amplifier is included in each filter path, AGC amplifier 302 is generally excluded.

In FIG. 3B, filter 320 is a band-pass filter arranged to pass signals having a frequency of about 9.8 kHz. Filter 321 is a band-pass filter arranged to pass signals having a frequency of about 82 kHz. Active filter 322 is a notch and band-pass (comb) filter that passes 50 Hz, 60 Hz or harmonics of 50 or 60 Hz. Filter 323 is a band-pass filter arranged to pass frequencies of about 35 kHz. Filter 324 is a filter designed to pass frequencies that are determined by the particular application of the line locator. Filter 325 passes RF frequencies (about 10 kHz to about 20 kHz). Filter 326 passes 50 or 60 Hz signals for power line locators. In addition to these frequencies, embodiments of this invention may include filters appropriate for specific applications such as, for example, detection of power lines. In addition, filters appropriate for particular transmitters 210, which may not use the more conventional 9.8 kHz or 82 kHz frequencies, can be included in filter 303.

The output signals from each of the filters is received by frequency select 327. Frequency select 327, in response to a FREQSEL signal, has an output signal corresponding to the output signal of one of the filters in the filter array. The FREQSEL signal can originate from an operator controlled switch or controller. In some embodiments, frequency select 327 separately outputs signals from active operation (for example, 9.8 kHz or 82 kHz signals) and from passive operation (for example 50 or 60 Hz signals from power lines) Additionally, Filter 320 can be a digital filter such as that described in U.S. Pat. No. 5,065,098, issued to Salsman et al., herein incorporated by reference in its entirety. Digital signal processing is especially useful if a microprocessor controls the line locator and processes signals received from the sensors.

In FIG. 3A, the output signal from filter 303 is amplified in AGC amplifier 304. The gain of AGC amplifier 304 is determined by the AGC signal. Rectifier 305 rectifies the output signal from AGC amplifier 304. Rectifier 305 can be any device for converting an AC signal to a DC signal. DC amplifier 306 amplifies the DC output signal from rectifier 305.

AGC generator 307 compares the output signal from DC amplifier 306 with a reference signal from set point 308 and outputs the AGC signal in response to this comparison. AGC generator 307 and the various AGC amplifiers (i.e., AGC amplifiers 302 and 304), through the AGC signal, create a feedback circuit. The AGC signal is varied such that the output signal from DC amplifier 306 is a constant voltage.

Figure 3C:
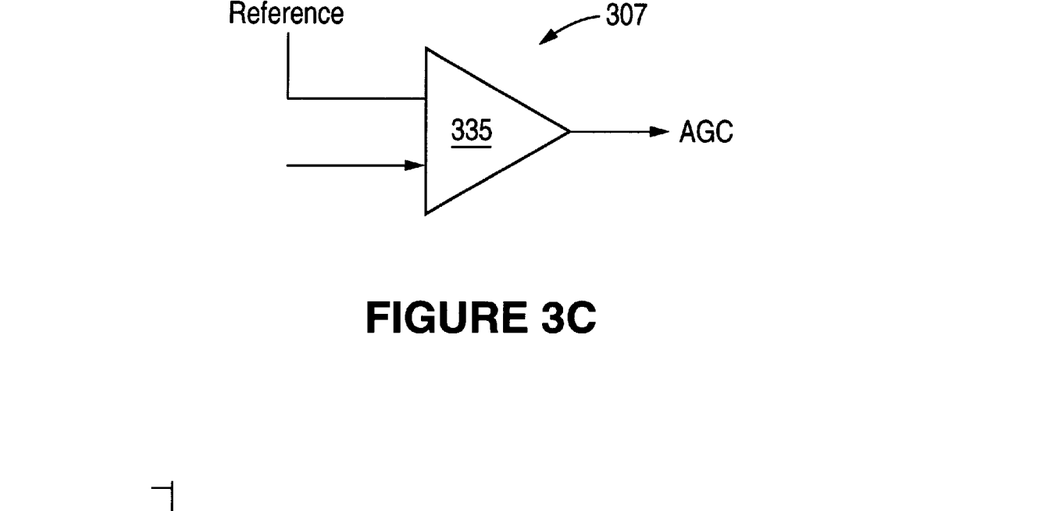
FIG. 3C shows a schematic diagram of an embodiment of an AGC generator circuit.

FIG. 3C shows a diagram of an AGC generator 307 that can be used in the present invention. AGC generator 307 includes analog comparator 335. Analog comparator 335 compares the input signal with a reference signal and outputs an AGC signal in response to the difference between the input signal and the reference signal.

Additionally, if channel 318 is being processed digitally by a microprocessor, then the AGC signal can be digitally generated in the microprocessor. Digital AGC generation is described in copending application "Line Locator Having Left/Right Detection," Application Ser. No. 09/136,767, by Gopal Parakulam and Stevan Polak, assigned to the same entity and filed on the same date as the present invention, herein incorporated by reference in its entirety. In addition, digital AGC generation is described in copending application "Line Locator Having Left/Right Detection," Application Ser. No. 09/136,794, by Gopal Parakulam and Stevan Polak, assigned to the same entity and filed on the same date as the present invention, herein incorporated by reference in its entirety In most embodiments, observed channel 319 and reference channel 318 are substantially identical except that the output signal from DC amplifier 314 in observed channel 319 is inputted to a display 315 and the output signal from DC amplifier 306 in reference channel 318 is inputted to AGC generator 307. In some embodiments, however, reference channel 318 and observed channel 319 may differ. One difference, for example, is that DC amplifier 306 may have a different gain than DC amplifier 314. In addition, observed 319 channel may include additional filtering either included in filter 311 or in separate filters (not shown) than reference channel 318.

In FIG. 3A, the output signal from sensor 317 is amplified in preamplifier 309 and amplified in AGC amplifier 310. The amplitude of the output signal from AGC amplifier 310 is determined by the AGC signal from AGC generator 307. Filter 311 inputs the output signal from AGC amplifier 310. Filter 311 typically is a band-pass filter that passes signals having a particular frequency. Filter 311 can be substantially the same as that described for filter 303 of reference channel 318.

The output signal from filter 311 is amplified in AGC amplifier 312. The output signal of AGC amplifier 312 has an amplitude determined by the AGC signal. The output from AGC amplifier 312 is rectified in rectifier 313, which is substantially the same as rectifier 305 of reference channel 318. The DC output from rectifier 313 is amplified in DC amplifier 314 before being inputted into display 315. Display 315 may include a speaker having a volume or a tone (i.e., pitch) that is indicative of the displacement of the line locator from a line or a visual indicator (such as a meter or a bar graph) that is indicative of the displacement of the line locator from a line. Additionally, display 315 may be a microprocessor based controller.

Figure 4:
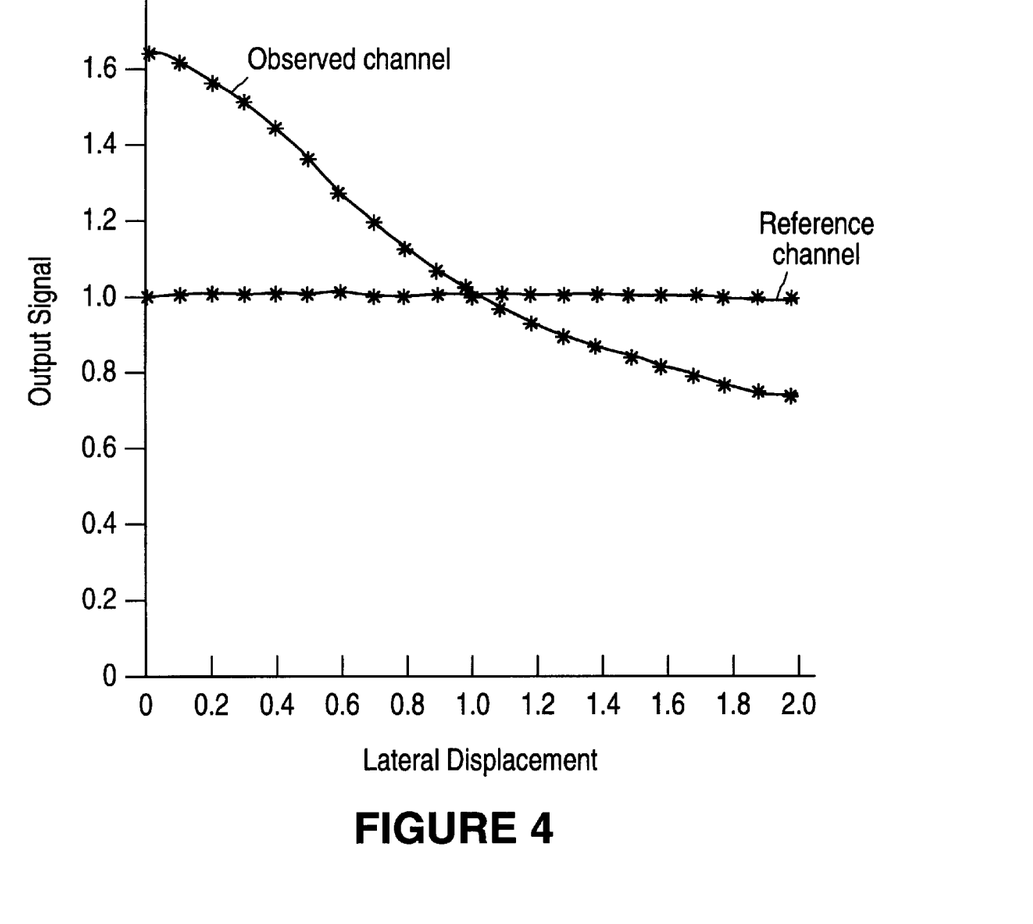
FIG. 4 shows a graph of the output signals from the circuit shown in FIG. 3A as a function of lateral displacement of the line locator from an elongated concealed conductor.

FIG. 4 shows the output signal from reference channel 318 and the output signal from observed channel 319 as a function of lateral displacement of the line locator from the line. The output signal from reference channel 318 is the output signal from DC amplifier 306. The output signal from observed channel 319 is the output signal from DC amplifier 314. As a result of AGC generator 307 and its control of circuit 300, the output signal from DC amp 306 in FIG. 3A is a constant voltage (arbitrarily designated as 1.0 in FIG. 4). The output signal from observed channel 319 has the advantage over the corresponding signals shown in FIG. 2C in that it does not vary in amplitude with outside parameters. The observed channel output, therefore, is simpler to utilize and requires much less circuitry than that required to obtain the corresponding information from the AGC signal itself. Additionally, because the sensors of the reference channel 318 are farther from the concealed conductor than the sensors of the observed channel, the output signal from observed channel 319 has a peak at a lateral displacement of zero.

Figure 5A:
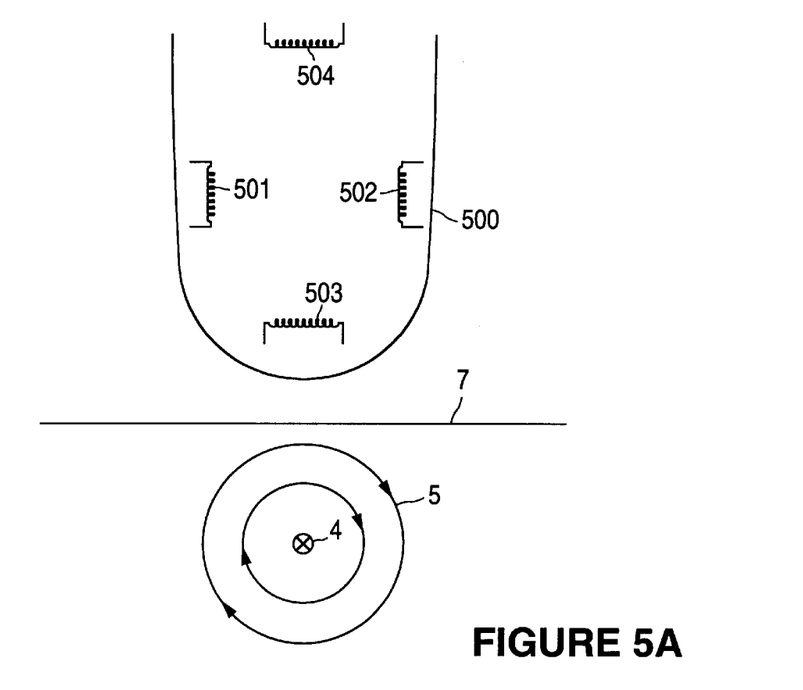
FIG. 5A shows a schematic diagram of a left/right line locator having multiple sensors.

Line locators according to this invention may have other observed channels as well. For example, in copending application "Line Locator Having Left/Right Detection," which has previously been incorporated by reference into this disclosure, a left/right line locator having an AGC circuit according to the present invention is described. FIG. 5A shows a line locator 500 having a bottom sensor 503, a top sensor 504, a left sensor 501 and a right sensor 502. In most embodiments, top sensor 504 and bottom sensor 503 are horizontally oriented to detect components of the magnetic field parallel to surface 7. Left sensor 501 and right sensor 502 may have any orientation but are shown in FIG. 5 to be vertically oriented. For left/right determination, left sensor 501 and right sensor 502 are symmetrically placed around bottom sensor 503. Bottom sensor 503 serves as an observed sensor. Top sensor 504 can be included in a reference channel for generating an AGC signal and may be placed anywhere in line locator 500. If top sensor 504 is being further used to determine the depth of line 4, top sensor 504 should be placed such that left sensor 501 and right sensor 502 are symmetrically located with respect to top sensor 504 as well.

Figure 5B:
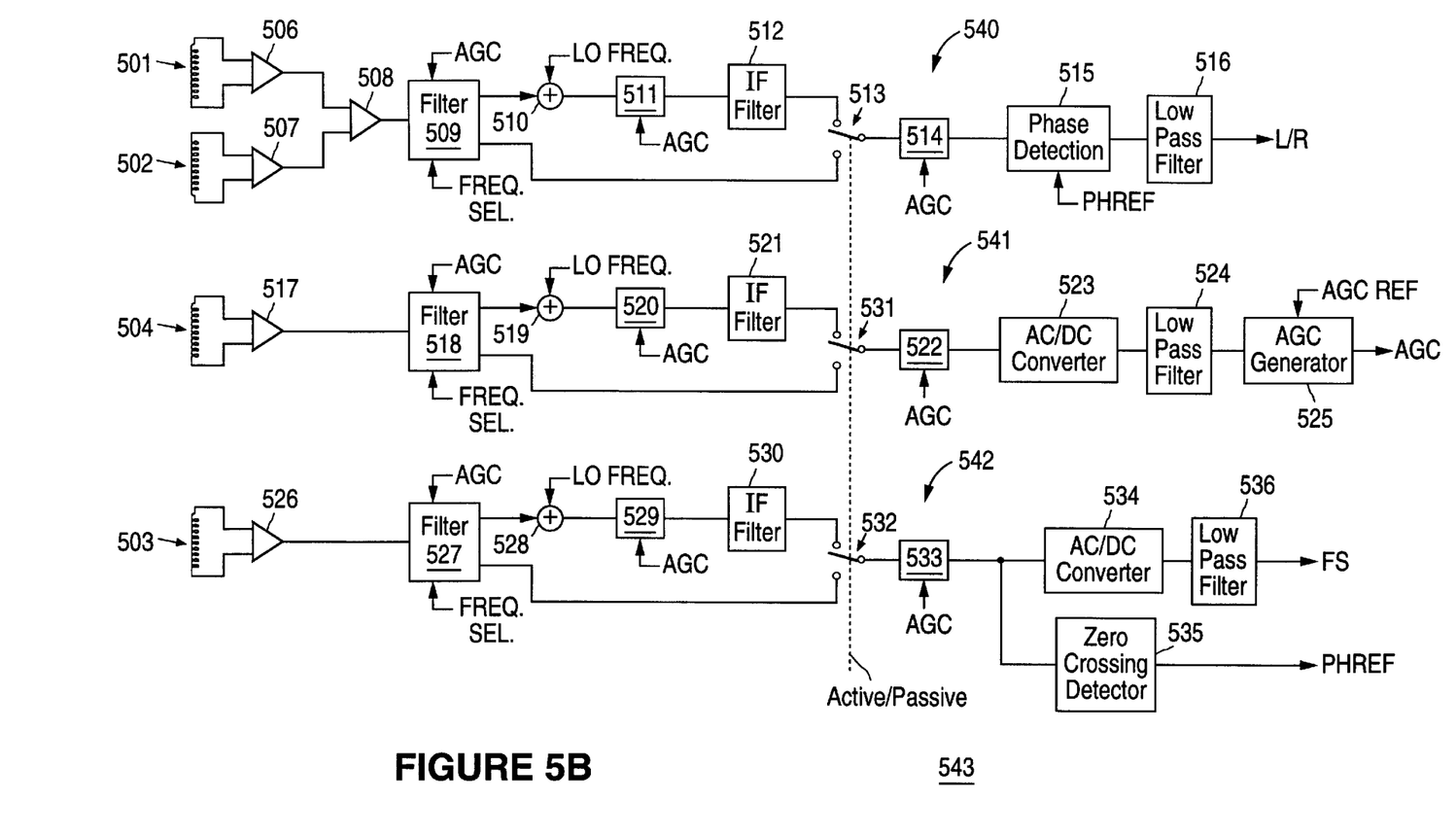
FIG. 5B shows a block diagram of a detection circuit for the left/right line locator of FIG. 5A according to the present invention.

FIG. 5B shows a block diagram of a detection circuit 543 for a left/right detecting line locator 500 according to the present invention. Detection circuit 543 includes a left/right channel 540, a reference channel 541, and an observed channel 542. The AGC signal is generated in reference channel 541.

The output signal from top sensor 504, the reference sensor, is amplified by a preamplifier 517 and filtered in filter 518. Filter 518 passes signals of a particular frequency in response to a FREQ. SEL. signal. The FREQ. SEL. signal is usually set by the operator. As was previously described (see FIG. 3B), filter 518 may have several different filter paths. In filter 518, each filter path has an AGC amplifier and a filter for a particular operating frequency. In some embodiments, a single AGC amplifier is supplied for all of the filter paths.

In some embodiments, filter 518 splits active frequencies (those requiring the use of an external transmitter 511) and passive signals (such as from a 50 or 60 Hz power line or broadband RF signals). Further filtering is easily possible on the active frequencies, which are generally narrow band and at higher frequencies defined by the transmitter (not shown). In contrast, passive signals are either at low frequencies (50 or 60 Hz) or are broadband RF signals (about 10 kHz to 20 kHz) ant are not further filtered. In addition, filter 518 may be a digital filter, as was previously discussed.

In the embodiment shown in FIG. 5B, the active output signals from filter 518 are mixed with a LO FREQ signal in mixer 519. In most embodiments, the LO FREQ signal is the frequency chosen by the FREQ. SEL. signal (i.e., the active operating frequency) plus a center frequency (about 560 Hz in some embodiments, although other embodiments may use a different center frequency). Mixer 519 receives the LO FREQ signal and the active output signal from filter 518 and outputs an output signal that has a beat frequency equal to the center frequency. Typically, mixer 519 subtracts the LO FREQ signal from the active output signal from filter 518.

The output signal from mixer 519 is input to AGC amplifier 520. The gain of AGC amplifier 520 is determined by the AGC signal. IF filter 521 is a narrow bandwidth band-pass filter that passes signals with frequency equal to the center frequency. Switch 531 chooses between the active signal path and the passive signal path in accordance with an active/passive signal. The active/passive signal is usually operator selected and is generally determined by the operator selected FREQ. SEL. signal (i.e., if 60 Hz is selected then the active/passive signal is set to passive).

The output signal from switch 531 is amplified by AGC amplifier 522. The output signal from AGC amplifier 522 is determined by the AGC signal. AC/DC converter 523 is a rectifier/amplifier that converts the output signal from AGC amplifier 522 into a DC signal. The DC signal from AC/DC converter 523 is filtered in low pass filter 524 and inputted into AGC generator 525.

AGC generator 525 outputs the AGC signal in response to a comparison of the output signal from low pass filter 524 with an AGC reference signal. AGC generator 525 can be the same as that shown in FIG. 3C or, as was previously discussed, can be a digital AGC generator. In FIG. 5B, the AGC signal, as determined in reference channel 541, is used throughout the remainder of signal processing circuit 543.

The output signal from left sensor 501 is amplified in preamp 506. The output signal from right sensor 502 is amplified in preamp 507. If left sensor 501 and right sensor 502 are vertically oriented, then the output signals from preamps 506 and 507 are summed in amplifier 508. When the output signals from preamps 506 and 507 are summed, the resulting output signal advantageously utilizes the polarity change in the vertical component of the magnetic field 5 (FIG. 5A) that is detected as the line locator is laterally passed over the concealed conductor. The polarity change in input signals in vertically oriented left/right sensors is further discussed in the copending application "Line Locator Having Left/Right Detection". Amplifier 508 may also convolute the output signals from preamps 507 and 508 using other convolution functions depending on the orientation of left sensor 501 and right sensor 502. For example, if left sensor 501 and right sensor 502 are horizontally oriented, amplifier 508 amplifies the difference between the output signals from preamplifiers 506 and 507.

Filter 509 can be any of the filters that have been discussed. The active output signal from filter 509 is mixed with the LO FREQ signal in mixer 510. The output signal from mixer 510 is inputted to AGC amplifier 511 and the output signal from AGC amplifier 511 is inputted to IF filter 512. Switch 513 selects the active frequency path or the passive frequency path in response to the active/passive signal. The output signal from switch 513 is inputted to AGC amplifier 514.

The output signal from AGC amplifier 514 is inputted to phase detector 515. Phase detector 515 receives a PHREF signal and outputs an output signal that is dependent on the amplitude and polarity of the output signal from preamp 508. Phase detector 515 compares the PHREF signal with the output signal from AGC amplifier 514 in order to determine the output signal. Phase detection is utilized in this context so that information regarding the polarity change in the magnetic field strength that is included in the output signal of amplifier 508 is not lost.

As shown in FIG. 5B, the PHREF signal is determined in a bottom sensor channel 542. Alternatively, the PHREF signal can be received into the line locator directly from the external transmitter or may be determined from reference channel 541. Additionally, the PHREF signal may be determined from another channel not shown in FIG. 5B. The PHREF signal has the same frequency as the magnetic field strength that is detected by sensors 501 through 504.

The output signal from phase detector 515 is inputted to low pass filter 516. Low pass filter 516 removes any lingering AC component of the output signal from phase detector 515. The left/right output signal from low pass filter 516, L/R, indicates the lateral position of the line locator with respect to the line, including whether the line locator is to the left or the right of the line.

The bottom sensor channel 542 is similar to reference channel 541 and left/right channel 540. The output signal from bottom sensor 503 is amplified in preamp 526 and filtered in filter 527. The active frequency output signal from filter 527 is mixed with the LO FREQ signal in mixer 528, amplified in AGC amp 529 and filtered in IF filter 530. Switch 532 selects between the active frequency signal and the passive frequency signal in response to the active/passive signal. The output signal from switch 523 is amplified in AGC amplifier 533 and converted to a DC signal in AC/DC converter 534. The output signal from AC/DC converter 534 is filtered in low pass filter 538 to create a field strength (FS) signal. Other signals may also be generated using this channel. For example, the FS signal may be further filtered to obtain a more stable signal indicating field strength that can be used in further calculations.

The PHREF signal that is utilized in left/right channel 540 can be derived from the bottom channel signal in zero crossing detector 535. Alternatively, reference channel 541 may include a zero crossing detector 535 for generating the PHREF signal. Also, the PHREF signal can be inputted, either with a direct electrical connection or with a wireless transmitter and receiver, from an external transmitter that is used to induce current in the concealed conductor. Zero crossing detector 535 outputs the PHREF signal, which has the same frequency as the operating frequency of the system (i.e., the same frequency as the magnetic field strengths measured at sensors 501 through 504), in response to the output signal from AGC amplifier 533.

The AGC signal from AGC generator 525 is used in AGC amplifiers 514, 527 and 533 as well as AGC amplifiers contained in filters 509, 518 and 527. Obtaining the AGC signal from top sensor 504 in a signal detection channel separate from the signal detection channels for other signals (i.e., left/right channel 540 and bottom channel 542) eliminates the previously discussed problems with using the AGC signal as data signals. The output signals from sensors 501, 502 and 503 can be used to display relevant data without the use of costly and complicated circuitry for obtaining that data from AGC signals associated with each signal processing channel.

Figure 5C:
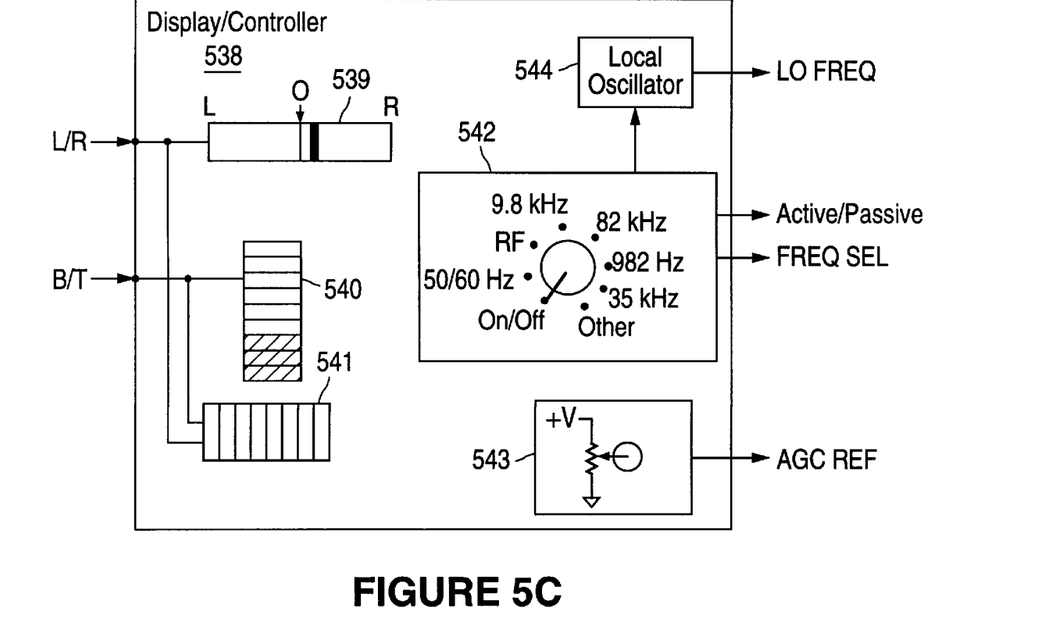
FIG. 5C shows a block diagram of a display/controller that can be utilized with the detection circuit of FIG. 5B.

FIG. 5C shows an embodiment of a display/controller 538. Display/controller 538 provides information to the operator and, usually in response to operator input, generates control signals (i.e., FREQ. SEL. and Active/Passive signals). Display/controller 538 receives the L/R signal and the FS signal and displays the relevant data to an operator. The data may be displayed visually (as with bar graphs and meters) or audibly (as with speaker tones or volumes). In FIG. 5C, meter 539 displays the information contained in the L/R signal; bar display 540 displays the information contained in the FS signal and speaker 541 operates with either the L/R signal or the FS signal to provide an audio display.

Additionally, display/controller 538 generates control signals and the LO FREQ signal. The FREQ. SEL signal and the Active/Passive signal are determined in by operator controlled selector knob 542. Local generator 544 generates the LO FREQ signal in response to an input signal from selector knob 542. The AGC reference signal is selected by adjustment 543 that can be an internal setting or can be operator controlled, i.e. with a knob. In some embodiments, display/controller 538 can include a microprocessor that further processes input signals and sets control signals in response to operator input.

The above examples are demonstrative only. One of ordinary skill in the art will recognize numerous variations from the example embodiments of this invention. It is intended that these variations be included within the scope of this invention. As such, the invention is limited only by the following claims.

I claim:

1. A line locator for locating an elongated concealed conductor, comprising:
    at least one observed channel that provides an observed signal in response to an output signal from an observed sensor and an AGC signal; and
    a reference channel that generates the AGC signal in response to an output sensor from a reference sensor, the reference sensor being further from the elongated concealed conductor than the observed sensor of the at least one observed channel.

2. The line locator of claim 1, wherein the at least one observed channel includes a bottom channel for indicating whether or not the line locator is positioned directly above a concealed conductor.

3. The line locator of claim 1, wherein the at least one observed channel includes a left/right channel for indicating whether the line locator is laterally displaced to the left or the right of a concealed conductor.

4. The line locator of claim 1, wherein the reference channel includes
    a filter coupled to the reference sensor to receive the output signal from the reference sensor;
    a rectifier coupled to receive the output signal from the filter; and
    an AGC generator coupled to the rectifier, the AGC generator generating the AGC signal in response to the output signal from the rectifier.

5. The line locator of claim 4, wherein the AGC generator includes a comparator wherein the AGC signal relates to the comparison of the output signal from the rectifier with a reference signal.

6. The line locator of claim 1, wherein the AGC signal is generated digitally in a microprocessor controller.

7. A method of processing output signals from a reference sensor and at least one observed sensor in a line locator wherein the reference sensor is located farther from an elongated concealed conductor than the at least one observed sensor, comprising:

deriving an AGC signal from the output signal of the reference sensor;

processing the output signals from the at least one observed sensor using the AGC signal to obtain a display signal; and displaying the display signal to an operator of the line locator.

8. The method of claim 7, wherein processing the output signals from the at least one observed sensor using the AGC signal includes amplifying a signal with an AGC amplifier in response to the AGC signal.

9. The method of claim 7, wherein deriving the AGC signal includes filtering the output signal from the reference sensor to create a filtered output signal;

converting the filtered output signal to a DC output signal;

comparing the DC output signal with a reference signal to create a comparison signal; and generating the AGC signal in response to the comparison signal.

10. The method of claim 7, wherein deriving an AGC signal includes filtering the output signal from the reference sensor to create a filtered output signal; and digitally calculating the AGC signal in response to the filtered output signal.

11. The method of claim 10, wherein filtering the output signal includes digitally filtering the output signal.

* * * * *